(12) United States Patent
Spencer

(10) Patent No.: US 6,619,638 B1
(45) Date of Patent: Sep. 16, 2003

(54) SUPPLEMENTARY TORSION SPRING ASSEMBLY

(75) Inventor: William Wilfred Spencer, East London (ZA)

(73) Assignees: Clive Kay Schewitz, Charlotte, NC (US); Frederick Woodhouse Toon, Charlotte, NC (US)

( * ) Notice: Subject to any disclaimer, the term of this patent is extended or adjusted under 35 U.S.C. 154(b) by 0 days.

(21) Appl. No.: 09/958,818

(22) PCT Filed: Apr. 14, 2000

(86) PCT No.: PCT/IB00/00469
§ 371 (c)(1),
(2), (4) Date: Dec. 6, 2001

(87) PCT Pub. No.: WO00/63578
PCT Pub. Date: Oct. 26, 2000

(30) Foreign Application Priority Data

Apr. 15, 1999 (ZA) .............................. 99/2743

(51) Int. Cl.$^7$ .............................. F16F 1/13; B06G 11/14
(52) U.S. Cl. .................. 267/287; 267/151; 267/169; 267/155
(58) Field of Search .................. 267/259, 287, 267/169, 166, 154, 155, 156, 157, 86, 151, 143, 286, 273; 280/124.141, 124.154; 5/260, 261, 262

(56) References Cited

U.S. PATENT DOCUMENTS

| 3,014,713 A | * | 12/1961 | Fenton |
| 3,028,156 A | | 4/1962 | Roehrig |
| 3,141,661 A | | 7/1964 | Melton et al. |
| 3,773,309 A | * | 11/1973 | Carter |
| 3,866,896 A | | 2/1975 | Wehner |
| 4,006,893 A | | 2/1977 | Spencer |
| 4,098,498 A | | 7/1978 | Da Silva |
| 4,726,574 A | | 2/1988 | Idigkeit et al. |

* cited by examiner

Primary Examiner—Douglas C. Butler
(74) Attorney, Agent, or Firm—Sterne, Kessler, Goldstein & Fox P.L.L.C.

(57) ABSTRACT

A supplementary spring assembly (104) is fitted to three consecutive turns (86.1, 86.2, 86.3) of a vehicle suspension coil spring (102). The spring assembly (104) includes a central torsion-producing portion (105) having a pair of half-turn torsion springs (106, 108). The half-turn torsion springs (106, 108) are connected to each other by a C-shaped bight portion (109) which engages an intermediate turn (86.1) of the coil spring (102) in a clamping fit. First and second arms (110, 112) extend from opposite ends of the torsion springs (106, 108) and pass slidably through complemental apertures (114) formed in mounting blocks (116). The mounting blocks (116) include a clamping arrangement in the form of a C-shaped recess formed in the block (116) which is sized to fit around non-adjacent turns (86.2, 86.3) of the coil spring (102). As a result, the arms (110, 112) can slide freely within the apertures (114) defined in the blocks (116) when the coil spring (102) is compressed, with the torsion springs (106) and (108) being arranged to supplement the action of the coil spring(102).

15 Claims, 3 Drawing Sheets

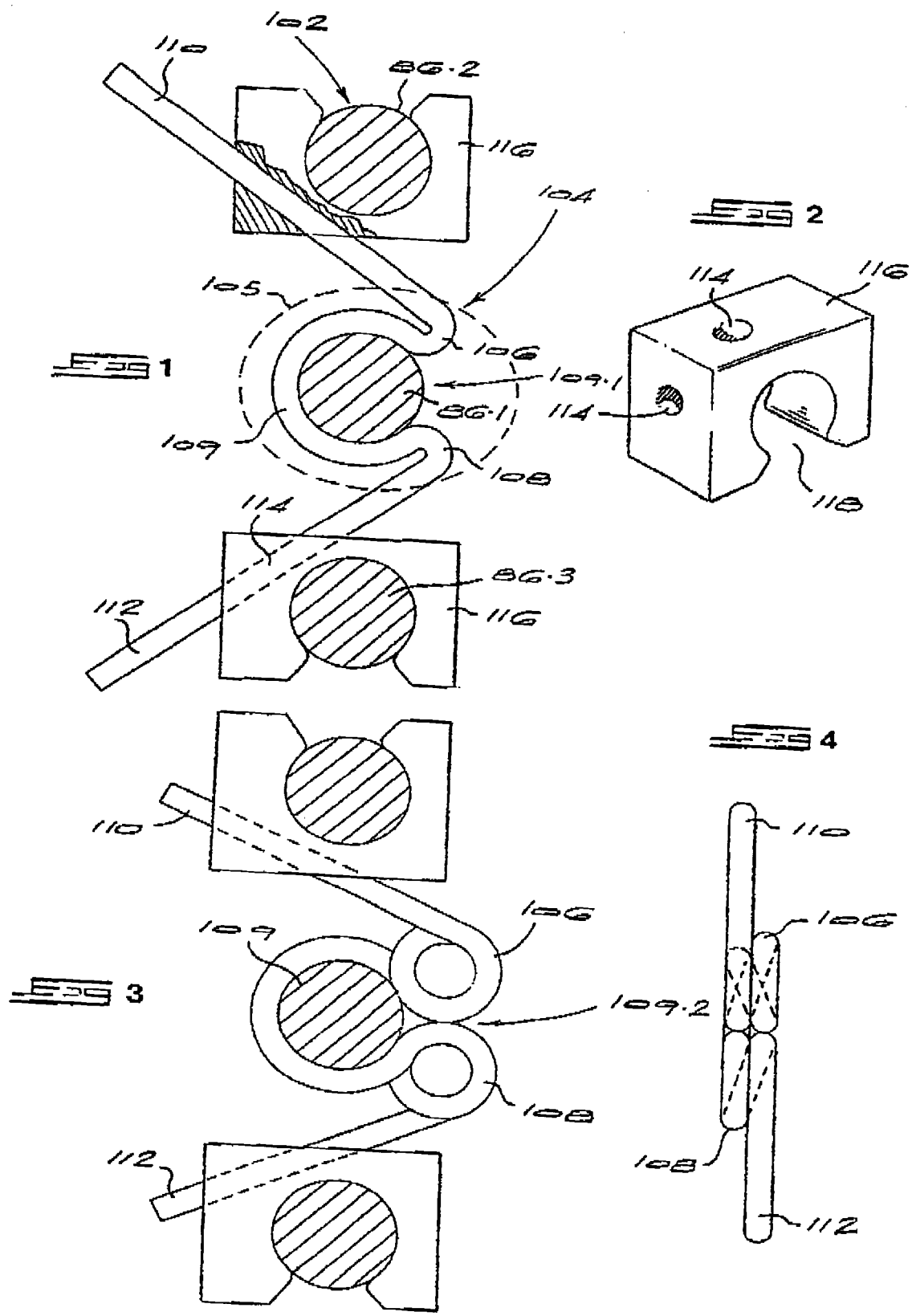

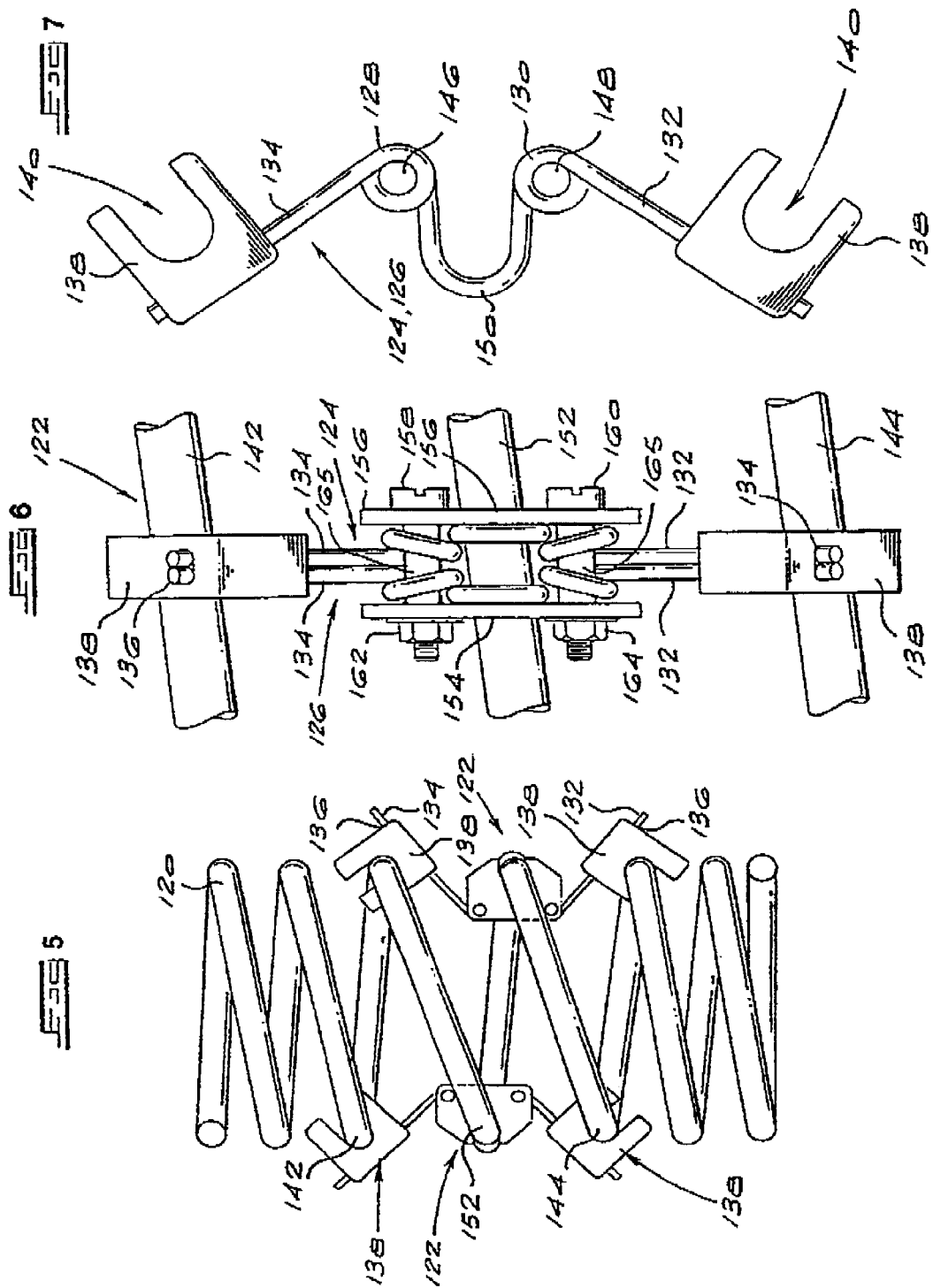

SUPPLEMENTARY TORSION SPRING ASSEMBLY

This application claims the benefit of International Application No. PCT/IB00/00469 which was published under PCT Article 21(2) in English.

BACKGROUND TO THE INVENTION

THIS Invention relates to a supplementary torsion spring assembly for a vehicle coil suspension spring.

A number of different methods exist for supplementing the coil springs of a vehicle so that the suspension acts more effectively when carrying a full load or when towing trailers or caravans. These range from the rudimentary, in the form of tennis bails which are located between adjacent turns of the coil spring, to various relatively sophisticated pneumatic and/or hydraulic arrangements which aim to prevent normal deflection of the spring. Tennis balls and similar elastomeric inserts tend to lose their elasticity with time, and are non-adjustable. Pneumatic and hydraulic arrangements, or even special heavy duty coil springs, can prove to be expensive.

SUMMARY OF THE INVENTION

According to the invention there is provided a supplementary torsion spring assembly for supplementing the compressive resistance of a coil spring, the spring assembly including a torsion spring having a central torsion-producing portion and first and second outwardly splayed arms extending from opposite ends of the torsion-producing portion and first and second corresponding arm mounting means for mounting the arms to non-adjacent turns of the coil spring.

In a preferred form of the invention, the supplementary torsion spring assembly includes intermediate mounting means for mounting the torsion-producing portion to an intermediate turn of the coil spring between the non-adjacent turns, with the first and second arms being mountable to the first and second arm mounting means in a sliding fit.

Preferably, the intermediate mounting means is integral with the torsion-producing portion and includes a central bight portion which is sized and shaped to engage the intermediate turn of the coil spring.

Conveniently, the bight portion terminates in a pair of torsion-producing turns from which the first and second arms extend.

In one form of the invention, the turns are approximate half turns.

Alternatively, the turns are approximate 3/2n turns, where n=1, 3 or 5.

Typically, the central bight portion is a C-shaped bight portion having a narrowed opening which is adapted to be widened by forcing free ends of the first and second arms towards one another, the C-shaped bight portion being sized and shaped to engage the intermediate turn of the coil spring in a compression fit by introducing the intermediate turn through the widened opening.

Preferably, each of the first and second arm mounting means include a mounting block having an aperture formed therein for slidably receiving the free ends of the first and second arms.

Conveniently, each of the mounting blocks include a spring-receiving opening for receiving the non-adjacent turn of the coil spring in a snap or friction fit.

In one form of the invention, the supplementary torsion spring assembly includes a pair of torsion springs and coupling means for coupling the pair of torsion springs together in a side-by-side relationship.

Conveniently, the coupling means include the first and second arm mounting means which are arranged simultaneously to mount the pairs of first and second arms to the non-adjacent turns of the coil spring.

Preferably, the coupling means further include a pair of cheek plates and at least one plate securing bolt for sandwiching the pair of torsion springs between the cheek plates.

Typically, the coil spring is a vehicle suspension coil spring.

The invention extends to a method of fitting a supplementary torsion spring assembly to a coil spring of a vehicle, the spring assembly including a central torsion spring having a torsion-producing portion, first and second outwardly splayed arms extending from opposite ends of the torsion-producing portion, and first and second corresponding arm mounting means for mounting the arms to non-adjacent turns of the coil spring, the method including the steps of:

mounting the torsion-producing portion to an intermediate turn of the coil spring between the non-adjacent turns; and fitting the first and second arms to the non-adjacent turns of the coil spring via the mounting means.

Preferably, the torsion-producing portion includes a central, substantially C-shaped bight portion shaped and sized to engage the intermediate turn, the method including the step of forcing the first and second arms towards one another to expand or define a narrowed opening in the C-shaped portion which is sufficient to receive the intermediate turn.

BRIEF DESCRIPTION OF THE DRAWINGS

FIG. 1 shows a side view of a first embodiment of a vehicle supplementary spring assembly of the invention fitted to a vehicle coil spring:

FIG. 2 shows a perspective view of a mounting block forming part of the supplementary spring assembly of FIG. 1;

FIG. 3 shows a side view of a second embodiment of a vehicle supplementary spring assembly of the invention;

FIG. 4 shows a front view of part of the spring assembly of FIG. 3;

FIG. 5 shows a side view of a third embodiment of a vehicle supplementary spring assembly of the invention fitted to a vehicle coil spring;

FIG. 6 shows a front view of the spring assembly of FIG. 5;

FIG. 7 shows a side view of part of the spring assembly of FIG. 5;

DESCRIPTION OF EMBODIMENTS

Figure 9:
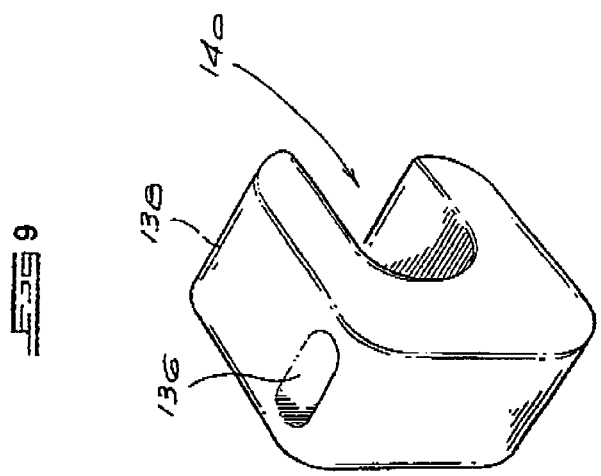
FIG. 9 shows a perspective view of a mounting block forming part of the supplementary spring assembly of FIGS. 5 to 7.

Referring to FIGS. 1 and 2, three consecutive turns of a vehicle suspension coil spring 102 are shown fitted with a supplementary spring assembly 104 having a central torsion-producing portion 105 including a pair of half-turn torsion springs 106 and 108 connected to each other by a C-shaped bight portion 109 which engages an intermediate turn 86.1 of the coil spring 102 in a clamping fit via a narrowed opening 109.1.

First and second arms 110 and 112 extend outwardly from the respective torsion springs 106 and 108. The arms 110 and 112 pass slidably through complemental apertures 114 formed in mounting blocks 116. The mounting blocks 116 include a clamping arrangement in the form of a C-shaped recess 118 formed In the block 116 which is sized to fit around a turn 86 of the vehicle coil spring 102 in a clamping fit. As a result, the arms 110 and 112 can slide freely within the apertures 114 defined in the blocks 116 when the coil spring 102 is compressed, with the torsion springs 106 and 108 being arranged to supplement the action of the coil spring 102.

Turning now to FIGS. 3 and 4, a second embodiment of the present invention is similar to the first embodiment except that the torsion springs 106 and 108 are each formed with one-and-a-half turns. The advantage of this arrangement is that the torsion springs are able to provide a greater resistance to the compression of the vehicle's coil spring 102.

Preferably, the supplementary torsion spring assembly 104 is fitted to the coil spring 102 by forcing the free ends of the first and second arms 110 and 112 towards one another so as to either expand the narrowed opening 109.1 in the case of the FIG. 1 embodiment, or to create an opening 109.2 in the case of the FIG. 3 embodiment, in the bight portion 109 which is sufficient to engage the intermediate turn 86.1. The mounting blocks 116 are then threaded along the arms 110 and 112 of the torsion springs 106 and 108 and clamped onto non-adjacent turns 86.2 and 86.3 of the vehicle's coil spring 102. The supplementary spring assembly 104 can be fitted so that the arms 110 and 112 face inwardly towards the central core of the coil spring 102, or outwardly in which the arms 110 and 112 face away from the coil spring 102.

Figure 8:
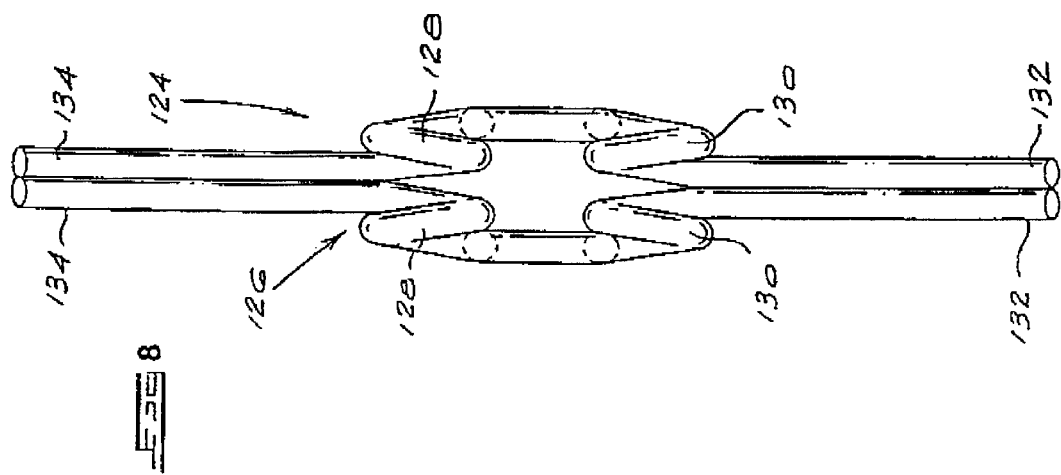
FIG. 8 shows a front view of part of the vehicle supplementary spring assembly of FIG. 5.

Turning now to FIGS. 5 to 9, a vehicle suspension coil spring 120 is shown fitted with a pair of supplementary spring assemblies 122. Each supplementary spring assembly 122 comprises a pair of torsion spring assemblies 124 and 126 mounted side by side, with each torsion spring assembly 124 and 126 comprising a pair of torsion springs 128 and 130, each having a diameter of approximately 4 mm. Each torsion spring assembly 124 and 126 has first and second arms 132 and 134 which extend outwardly and pass slidably through complemental apertures 136 formed in mounting blocks 138. Each mounting block 138 includes a U-shaped recess 140 which is seed to fit around non-adjacent turns 142 and 144 of the vehicle coil spring 120. As with the first and second embodiments, the arms 132 and 134 slide freely within the apertures 136 defined in the blocks 138 when the coil spring 120 is compressed.

Each torsion spring 128 and 130 is formed with one-and-a-half helical turns, thereby defining a pair of apertures 146 and 148. A U-shaped bight portion 150 extends between the torsion springs so as to engage an intermediate turn 152 of the coil spring 102.

The torsion spring assemblies 124 and 126 are mounted side-by-side by means of the mounting blocks 138 in conjunction with a pair of cheek plates 154 and 156. The cheek plates 154 and 156 are bolted together by threaded bolts 158 and 160 which pass through apertures in the cheek plates 154 and 156 and through the apertures 146 and 148 of the torsion springs 128 and 130. The bolts 158 and 160 are secured in position by means of complementally threaded lock nuts 162 and 164 respectively. Spacer sleeves 166 also extend through the apertures 146 and 148 and serve to space the plates 154, 156 a fixed distance apart from one another.

To mount the supplementary torsion spring assembly 122 onto the coil spring 120, the vehicle has to be raised to allow the coil spring 120 to hang free, with the rear wheel of the vehicle being removed to facilitate access to the coil spring 120. The supplementary torsion spring assembly 122 is packaged with both mounting blocks 138 already fitted to both torsion spring assemblies 124 and 126. Thus, both spring assemblies 124 and 126 are mounted simultaneously onto the coil spring 120, thereby simplifying the mounting of the supplementary torsion spring assembly 122. One of the mounting blocks 138 is fitted onto the upper turn 142 of the coil spring 120 either by pressing the block 138 onto the coil or by gently tapping the block into position with a mallet. The bight portions 142 of both torsion spring assemblies are then fitted to the adjacent coil and then finally the second mounting block 138 is fitted to the lower turn 144 of the of the coil spring 120. Once the coil torsion spring assemblies 124 and 126 and mounting blocks 138 have been fitted onto the coil spring 120, the cheek plates 154 and 156 are then bolted to the torsion spring assemblies 124 and 126.

The supplementary spring assembly 104, 122 is preferably fitted so that the arms 110, 132 and 112, 134 face inwardly towards the central core of the coil spring 102, 120, or alternatively outwardly in which the arms 110, 132 and 112, 134 face away from the coil spring 102.

Each suspension coil spring of a vehicle is fitted with a minimum of two diametrically opposed supplementary spring assemblies. Depending on the gross vehicle mass and the load bearing capacity, further supplementary spring assemblies can be fitted to each coil spring, with up to 5 or 6 assemblies being able to be fitted to each coil spring, at equiangular locations along the spring, and preferably arranged in opposed pairs for purposes of stability and counter-balance.

A significant advantage of the invention is that the supplementary torsion spring assemblies can be quickly and simply retro-fitted to the vehicle coil spring without having to remove or adjust the springs.

What is claimed is:

1. A supplementary torsion spring assembly for supplementing the compressive resistance of a coil spring, the spring assembly including a torsion spring having a central torsion-producing portion and first and second outwardly splayed arms extending from opposite ends of the torsion-producing portion, the ends of the arms defining free ends, and first and second corresponding arm mounting means mountable to non-adjacent turns of the coil spring for slidably receiving the free ends of the first and second arms, wherein the free ends of the splayed arms are slidingly fit into the arm mounting means, providing continuous and progressive resistance when the coil spring is compressed.

2. A supplementary torsion spring assembly according to claim 1 which includes intermediate mounting means for mounting the torsion-producing portion to an intermediate turn of the coil spring between the non-adjacent turns.

3. A supplementary torsion spring assembly according to claim 2 in which the intermediate mounting means is integral with the torsion-producing portion and includes a central bight portion which is sized and shaped to engage the intermediate turn of the coil spring.

4. A supplementary torsion spring assembly according to claim 3 in which the bight portion terminates in a pair of torsion-producing turns from which the first and second arms extend.

5. A supplementary torsion spring assembly according to claim 4 in which the turns are approximate half turns.

6. A supplementary torsion spring assembly according to claim 4 in which the turns are approximate 3/2n turns, where n=1, 3 or 5.

7. A supplementary torsion spring assembly according to any one of claims 3 to 6 in which the central bight portion is a C-shaped bight portion having a narrowed opening which is adapted to be widened by forcing the free ends of the first and second arms towards one another, the C-shaped bight portion being sized and shaped to engage the intermediate turn of the coil spring in a compression fit by introducing the intermediate turn through the widened opening.

8. A supplementary torsion spring assembly according to claim 1 in which each of the first and second arm mounting means include a mounting block having an aperture formed therein for slidably receiving the free ends of the first and second arms.

9. A supplementary torsion spring assembly according to claim 8 in which each of the mounting blocks include a spring-receiving opening for receiving the non-adjacent turn of the coil spring in a snap or friction fit.

10. A supplementary torsion spring assembly according to claim 1 which includes a pair of torsion springs and coupling means for coupling the pair of torsion springs together in a side-by-side relationship.

11. A supplementary torsion spring assembly according to claim 10 in which the coupling means include the first and second arm mounting means which are arranged simultaneously to mount the pairs of first and second arms to the non-adjacent turns of the coil spring.

12. A supplementary torsion spring assembly according to either one of claims 10 to 11 in which the coupling means include a pair of cheek plates and at least one plate securing bolt for sandwiching the pair of torsion springs between the cheek plates.

13. A supplementary torsion spring assembly according to claim 1 in which the coil spring is a vehicle suspension coil spring.

14. A method of fitting a supplementary torsion spring assembly to a coil spring of a vehicle, the spring assembly including a central torsion spring having a torsion-producing portion, first and second outwardly splayed arms extending from opposite ends of the torsion-producing portion, the ends of the arms defining free ends, and first and second corresponding arm mounting means for slidably mounting the arms to non-adjacent turns of the coil spring, the method including the steps of:

mounting the torsion-producing portion to an intermediate turn of the coil spring between the non-adjacent turns;

fitting the first and second arms to the first and second arm mounting means, respectively; and mounting the first and second arm mounting means to non-adjacent turns of the coil spring, so that the free ends of the first and second arms are slidably received by the first and second arm mounting means.

15. A method according to claim 14 in which the torsion-producing portion includes a central, substantially C-shaped bight portion shaped and sized to engage the intermediate turn, the method including the step of forcing the first and second arms towards one another to expand or define a narrowed opening in the C-shaped portion which is sufficient to receive the intermediate turn.

* * * * *